United States Patent
Won et al.

(10) Patent No.: US 9,961,586 B2
(45) Date of Patent: May 1, 2018

(54) METHOD AND APPARATUS FOR MANAGING CONGESTION IN WIRELESS COMMUNICATION SYSTEM

(71) Applicant: Samsung Electronics Co., Ltd., Gyeonggi-do (KR)

(72) Inventors: Sung Hwan Won, Seoul (KR); Sang Soo Jeong, Gyeonggi-do (KR); Song Yean Cho, Seoul (KR); Han Na Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 14/383,762

(22) PCT Filed: Mar. 8, 2013

(86) PCT No.: PCT/KR2013/001894
§ 371 (c)(1),
(2) Date: Sep. 8, 2014

(87) PCT Pub. No.: WO2013/133665
PCT Pub. Date: Sep. 12, 2013

(65) Prior Publication Data
US 2015/0156666 A1    Jun. 4, 2015

Related U.S. Application Data

(60) Provisional application No. 61/608,580, filed on Mar. 8, 2012.

(30) Foreign Application Priority Data

Mar. 29, 2012 (KR) .................. 10-2012-0032173
Aug. 6, 2012 (KR) .................. 10-2012-0085558
Jan. 17, 2013 (KR) .................. 10-2013-0005539

(51) Int. Cl.
*H04L 12/26* (2006.01)
*G06F 15/16* (2006.01)
(Continued)

(52) U.S. Cl.
CPC ... *H04W 28/0289* (2013.01); *H04W 28/0231* (2013.01)

(58) Field of Classification Search
CPC ............. H04W 28/02; H04W 28/0231; H04W 28/0289; H04L 12/801; H04L 47/31;
(Continued)

(56) References Cited

U.S. PATENT DOCUMENTS 6,311,055 B1   10/2001 Boltz
6,466,786 B1   10/2002 Wallenius
(Continued)

FOREIGN PATENT DOCUMENTS

CN   1878345      12/2006
CN   101998357    3/2011
(Continued)

OTHER PUBLICATIONS

T-Mobile, Orange, "S1-U TNL congestion indication", 3GPP TSG-RAN WG3 Meeting #59bis, R3-080861, Mar. 31-Apr. 3, Shenzhen (China).*
(Continued)

*Primary Examiner* — Edan Orgad
*Assistant Examiner* — Vanneilian Lalchinthang
(74) *Attorney, Agent, or Firm* — The Farrell Law Firm, P.C.

(57) ABSTRACT

According to one embodiment, a method for controlling congestion at an evolved node B (eNB) in a wireless communication network is provided. This method includes a step of sensing whether the congestion occurs or not; and a reporting step of transmitting congestion information,
(Continued)

including whether the congestion occurs or not, to a mobility management entity (MME) or a serving gateway (S-GW). According to another embodiment, a method for controlling the congestion at a packet data network gateway (P-GW) in the wireless communication network is provided. Additionally, apparatuses for implementing these methods are also provided.

15 Claims, 8 Drawing Sheets

(51) Int. Cl.
*H04L 12/24* (2006.01)
*H04W 28/02* (2009.01)

(58) Field of Classification Search
CPC ..... H04L 43/0829; H04L 29/08; H04L 47/32; H04L 67/327; G06F 15/16
USPC .......................................................... 370/229
See application file for complete search history.

(56) References Cited

U.S. PATENT DOCUMENTS

| | | | |
|---|---|---|---|
| 2005/0169223 A1 | 8/2005 | Crocker et al. | |
| 2008/0039104 A1 | 2/2008 | Gu et al. | |
| 2008/0091766 A1* | 4/2008 | Briscoe ............... | H04L 12/5602 709/202 |
| 2009/0039104 A1 | 2/2009 | Genewick et al. | |
| 2011/0235569 A1 | 9/2011 | Huang et al. | |
| 2011/0261695 A1* | 10/2011 | Zhao et al. .................... | 370/232 |
| 2012/0051216 A1* | 3/2012 | Zhang ..................... | H04L 47/12 370/230 |
| 2012/0314569 A1* | 12/2012 | Liu ................... | H04W 36/0094 370/230 |
| 2013/0308527 A1* | 11/2013 | Chin et al. .................... | 370/328 |
| 2014/0293793 A1* | 10/2014 | Racz et al. .................... | 370/235 |

FOREIGN PATENT DOCUMENTS

| | | |
|---|---|---|
| EP | 2731373 A1 * | 5/2014 |
| JP | 2009-514348 | 4/2009 |
| JP | 2010-154079 | 7/2010 |
| KR | 1020120011012 | 2/2012 |
| WO | WO 99/18704 | 4/1999 |
| WO | WO 2007/076410 | 7/2007 |

OTHER PUBLICATIONS

PCT/ISA/237 Written Opinion issued on PCT/KR2013/001894 (pp. 4).
PCT/ISA/210 Search Report issued on PCT/KR2013/001894 (pp. 3).
T-Mobile, Orange, "S1-U TNL congestion indication", R3-080861, 3GPP TSG-RAN WG3 Meeting #59bis, Mar. 31-Apr. 3, 2008 (pp. 3).
Alcatel-Lucent, "Originating & Terminating Network Information Flows", C4-112274, 3GPP TSG CT WG4 Meeting #54bis, Oct. 10-14, 2011, 4 pages.
Qualcomm Europe, "PS Bearer Handling in Redirection/NACC/CCO based CSFB", TD S2-097060, 3GPP TSG SA WG2 Meeting #76, Nov. 16-20, 2009, 8 pages.
Japanese Office Action dated Dec. 26, 2016 issued in counterpart application No. 2014-560858, 12 pages.
European Search Report dated Dec. 20, 2016 issued in counterpart application No. 13758097.3-1857, 7 pages.
3rd Generation Partnership Project; Technical Specification Group Core Network and Terminals; Technical Realization of Operator Determined Barring (ODB), Release 10, 3GPP TS 23.015, V10.0.0, Dec. 2010, 29 pages.
Samsung, "Filtering CS Paging without SMS Indicator for SMS Only UE", S2-095346, 3GPP TSG-SA WG2 Meeting #75, Aug. 31-Sep. 4, 2009, 6 pages.
Chinese Office Action dated Jul. 13, 2017 issued in counterpart application No. 201380012408.4, 17 pages.
Japanese Office Action dated May 8, 2017 issued in counterpart application No. 2014-560858, 9 pages.
Qualcomm Incorporated, "Corrections Related to Use of Location Area Identifier IE at MME Upon Receiving SGsAP-Paging-Request Message", C1-103430, 3GPP TSG-CT WG1 Meeting #66, Aug. 23-27, 2010, 3 pages.
Motorola, "Correction to the SMS Paging Procedure", C1-094931,3GPP TSG-CT WG1 Meeting #62, Nov. 9-13, 2009, 2 pages.
Japanese Office Action dated Feb. 6, 2018 issued in counterpart application No. 2017-0195477, 4 pages.
Chinese Office Action dated Feb. 8, 2018 issued in counterpart application No. 201380012408.4, 18 pages.

* cited by examiner

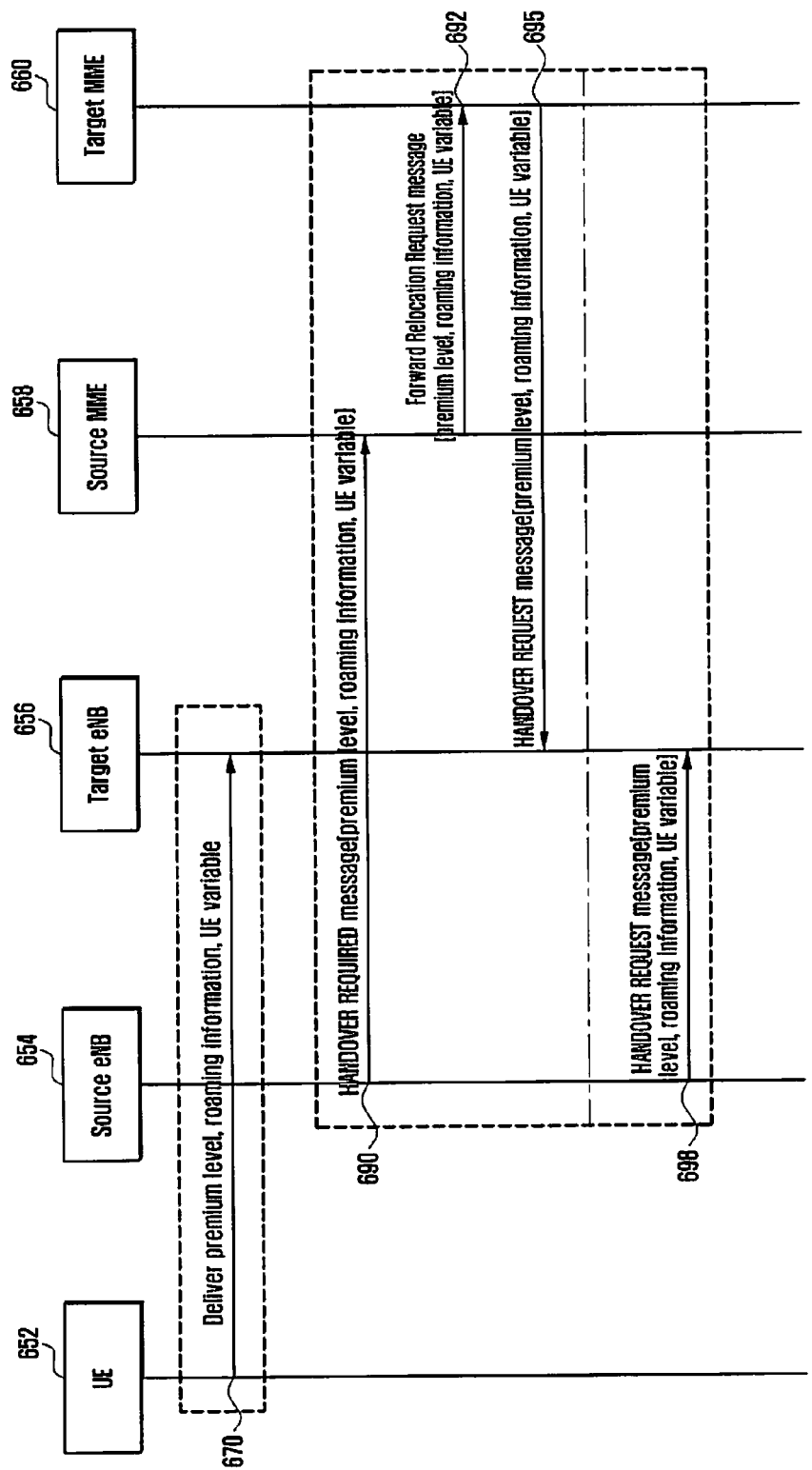

METHOD AND APPARATUS FOR MANAGING CONGESTION IN WIRELESS COMMUNICATION SYSTEM

TECHNICAL FIELD

The present invention relates to a method and apparatus for obviating congestion in a wireless communication system. More particularly, this invention relates to a method and apparatus for notifying the congestion of a radio access network to a core network and user equipment, and to a method and apparatus for allowing the core network and the user equipment, which become aware of such congestion, to control a communication speed according to user/bearer/application and thereby to obviate such a congestion.

BACKGROUND ART

A wireless communication system has been developed to offer a voice service and a data service while keeping user's mobility. A wireless communication system may be formed of a radio access network, a core network, and the other elements. User equipment (UE) is wirelessly connected with a certain element, i.e., an eNB, of the radio access network, whereas the radio access network, the core network, and nodes of the core network are mainly wire-connected with each other.

Since wireless resources are generally limited in comparison with wired resources, there is a strong possibility that the lack of wireless resources will be caused between the UE and the radio access network. This situation of facing with the lack of wireless resources between the UE and the radio access network is referred to as congestion of the radio access network.

In 3GPP (3rd Generation Partnership Project), the eNB is forced to obviate the congestion of the radio access network. Specifically, if any congestion occurs in the radio access network, this congestion is obviated in a way of abandoning data transmission rather than reducing a communication speed when it is not possible any more to guarantee a required communication speed with regard to GBR (Guaranteed Bit Rate) data that require a guarantee of a communication speed on a certain level, and in a way of reducing a communication speed with regard to non-GBR data that require no guarantee of a communication speed on a certain level. In case of non-GBR data, downlink data are transmitted to the radio access network through the packet data network (PDN) and the core network at the same communication speed as in any non-congestion situation. However, since the radio access network fails to deliver such data to the UE at the same communication speed as in any non-congestion situation, such data are accumulated in a buffer of the eNB or selectively abandoned by the eNB. Meanwhile, uplink non-GBR data to be delivered from the UE to the radio access are accumulated in a buffer of the UE or selectively abandoned by the UE due to an insufficient allocation of resources from the radio access network.

Current technique to obviate congestion of downlink and uplink data has some drawbacks that data are uniformly treated without any consideration for data characteristics such as a user of data, a channel of data transmission, or a type of data, and that downlink data are delivered to the radio access network through the core network without distinction of congestion or non-congestion situation and thereby much data, which are incapable of being properly transmitted to the UE by the eNB in a congestion situation, are unnecessarily delivered to the radio access network.

Accordingly, required is new technique to obviate congestion by considering data characteristics and involving the core network and the UE therein.

DISCLOSURE OF INVENTION

Technical Problem

The present invention is proposed to solve the above drawbacks and has the aim of providing a method for allowing the eNB, which suffers congestion, to notify congestion to the core network and the UE, a method for allowing the core network and the UE, which become aware of congestion, to obviate congestion by controlling a data communication speed according to data characteristics, and a method for allowing the eNB to obtain information required for controlling congestion according to data characteristics.

Solution to Problem

In order to achieve the above aim, according to one embodiment of the present invention, a method for controlling congestion at an evolved node B (eNB) in a wireless communication network includes a step of sensing whether the congestion occurs or not; and a reporting step of transmitting congestion information, including whether the congestion occurs or not, to a mobility management entity (MME) or a serving gateway (S-GW).

According to another embodiment of the present invention, a method for controlling congestion at a packet data network gateway (P-GW) in a wireless communication network includes a receiving step of receiving congestion information, including whether the congestion occurs or not, transmitted from an evolved node B (eNB); a sensing step of sensing whether the congestion occurs or not, based on the received congestion information; and a controlling step of controlling the congestion, based on the received congestion information.

According to still another embodiment of the present invention, an apparatus of an evolved node B (eNB) for controlling congestion in a wireless communication network includes a control unit configured to sense whether the congestion occurs or not; and a transceiver unit configured to transmit congestion information, including whether the congestion occurs or not, to a mobility management entity (MME) or a serving gateway (S-GW).

According to yet another embodiment of the present invention, an apparatus of a packet data network gateway (P-GW) for controlling congestion in a wireless communication network includes a transceiver unit configured to receive congestion information, including whether the congestion occurs or not, transmitted from an evolved node B (eNB); and a control unit configured to sense whether the congestion occurs or not, based on the received congestion information, and to control the congestion, based on the received congestion information.

Advantageous Effects of Invention

The present invention allows the eNB, the UE and the core network to adjust a communication speed by using information about data, thus allowing a control of communication speed by data characteristics including a bearer, a user, and an application, and further allowing an efficient use of resources in the core network.

BRIEF DESCRIPTION OF DRAWINGS

FIG. 6b is a flow diagram illustrating a signal flow for implanting user information in a target eNB through a handover procedure, for a congestion control through a communication speed control for each user in accordance with an embodiment.

MODE FOR THE INVENTION

Hereinafter, an embodiment of the present invention will be fully described with reference to the accompanying drawings. The following description is provided to assist in a comprehensive understanding of various embodiments of the present invention as defined by the claims and their equivalents. It includes various specific details to assist in that understanding but these are to be regarded as merely exemplary.

Although embodiments of this invention will be described hereinafter on the basis of LTE (Long Term Evolution) and EPC (Evolved Packet Core) which are respectively defined as a radio access network and a core network by 3GPP standards, the essential concept of the present invention may be favorably applied to any other communication system having a similar technical background without departing from the scope of this invention as will be understood by those skilled in the art.

Figure 1:
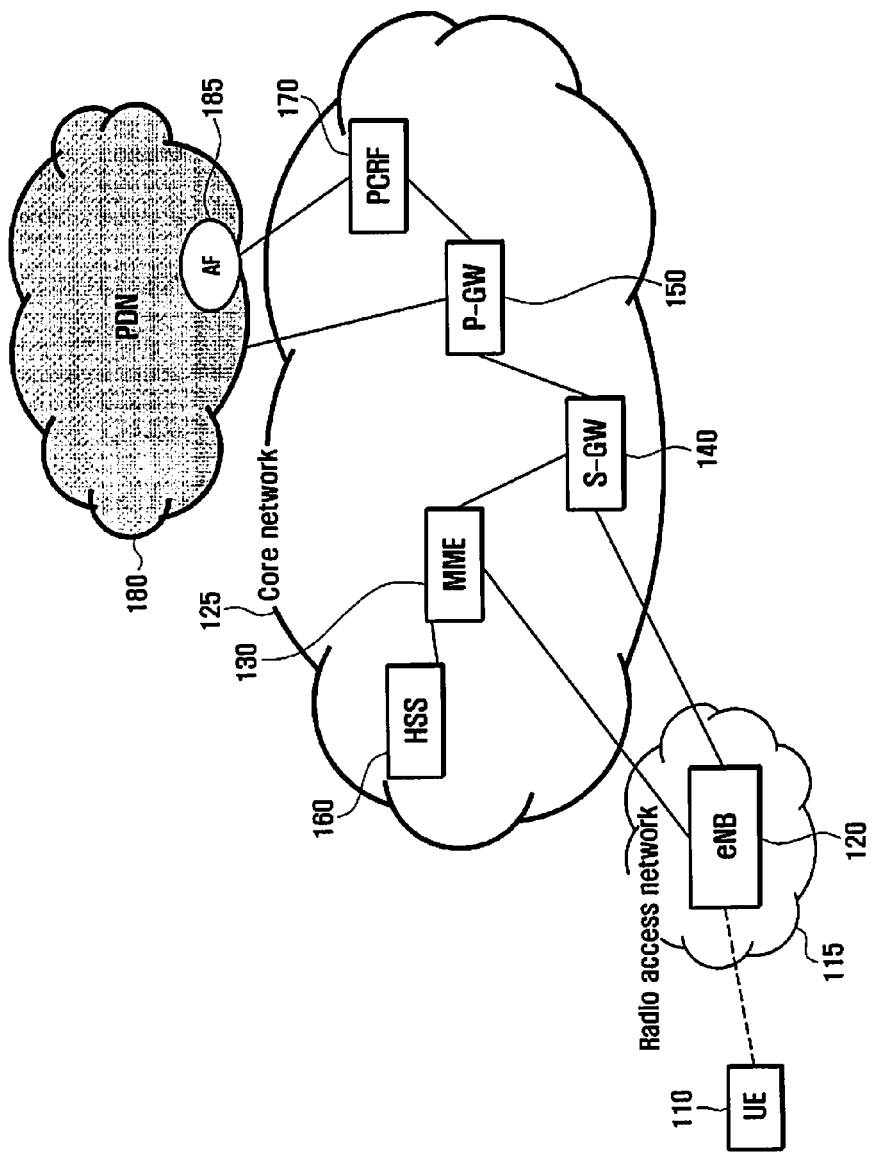
FIG. 1 is a block diagram illustrating the configuration of a wireless communication system in accordance with an embodiment.

FIG. 1 is a block diagram illustrating the configuration of a wireless communication system in accordance with an embodiment.

Referring to FIG. 1, a wireless communication system, to which this invention is applied, may include UE (User Equipment) 110, a radio access network 115, a core network 125, and a PDN (Packet Data Network) 180. Each element shown in FIG. 1 may include therein a transceiver unit for transmitting or receiving data to or from any other element, and a control unit for controlling its internal components.

The UE 110 uses a voice service or a data service offered by the wireless communication system. Although data offered through the wireless communication system are classified into GBR data and non-GBR data, data in an embodiment may be used as the same meaning as non-GBR data. In any alternative embodiment, a system for offering GBR data may be proposed.

In an embodiment, the UE 110 may include, for example, at least one of a mobile phone, a notebook, a table PC, a camera, an electronic picture frame, a vending machine, a CCTV, an electric meter sensor, a water meter sensor, a seismic sensor, or a fire alarm sensor of building.

The radio access network 115 may contain at least one eNB (evolved Node B, also referred to as eNodeB) 120. The eNB 120 is a base station that administers a cell. Here, this cell means a cell in a normal cellular system, and the eNB 120 is a base station that manages and controls such a cell. However, for convenience sake, a cell and a base station may be used as the same meaning in this invention.

The eNB 120 may be connected with the UE 110 through a wireless channel and control wireless resources. For example, the eNB 120 may create and broadcast, as system information, control information required for a cell, or allocate wireless resources for transmitting or receiving data or control information to or from the UE 110.

The core network 125 may include therein an MME (Mobility Management Entity) 130, an S-GW (Serving Gateway) 140, a P-GW (PDN Gateway) 150, an HSS (Home Subscriber Server) 160, and a PCRF (Policy Control and Charging Rules Function) 170.

The MME 130 may manage the UE 110 being in an idle mode, and select the P-GW 150 and the S-GW 140 which are connectable. Additionally, the MME 130 may perform particular functions associated with roaming and authentication. Also, the MME 130 may handle a bearer service generated by the UE 110. Here, a bearer service may include a specific service that offers the ability to deliver real-time data between the UE 130 and the PDN 180.

The S-GW 140 may perform a role of mobility anchor when the UE 110 performs handover between the eNBs 120 or moves between 3GPP wireless networks.

The P-GW 150 may allocate an IP address to the UE 110, perform a function associated with packet data of the core network 125, and perform a role of mobility anchor in case of movement between a 3GPP wireless network and a non-3GPP wireless network. Additionally, the P-GW 150 may determine a bearer band to be offered to a subscriber, and perform forwarding and routing functions for packet data. The HSS 160 stores therein subscription information about each UE 110. Also, the HSS 160 transmits subscription information about the UE 110 to the MME 130 in response to access of the UE 110 to a network such that the MME 130 can use it for controlling the UE 110.

The PCRF 170 may control functions associated with a bearer policy and charging.

The PDN 180 manages packet data to be transmitted to or received from the UE 110. The PDN 180 may include therein an AF (Application Function) 185 that manages an application requiring a dynamic control of policy and charging.

Figure 2A:
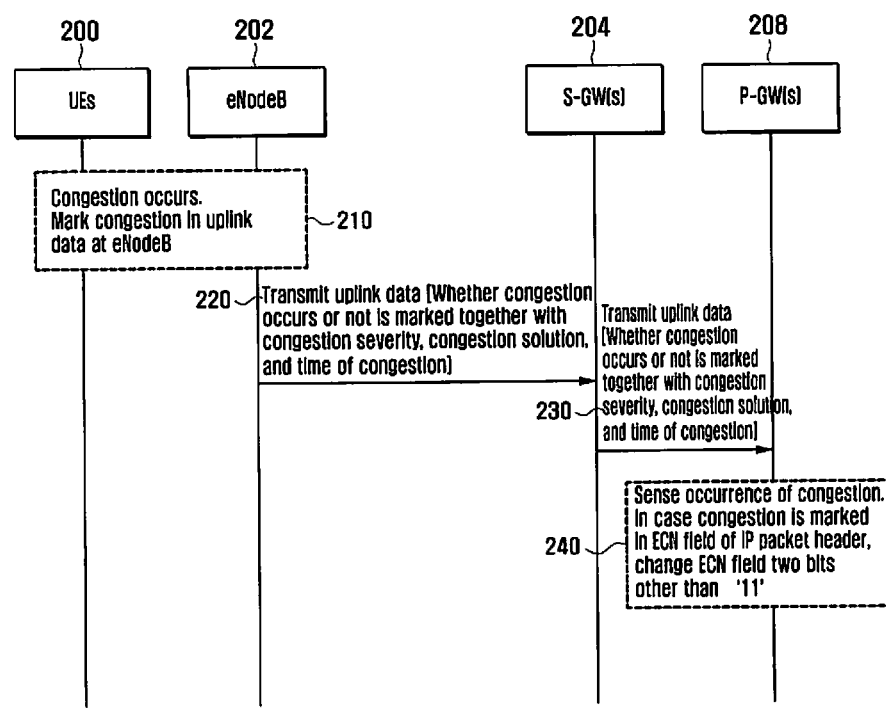
FIG. 2a is a flow diagram illustrating a signal flow for notifying congestion of a radio access network through uplink data in accordance with an embodiment.

FIG. 2a is a flow diagram illustrating a signal flow for notifying congestion of a radio access network through uplink data between one or more UEs 200, an eNodeB 202, an S-GW 204, and a P-GW 208 in accordance with an embodiment.

Referring to FIG. 2a, at step 210, the eNodeB 202 may sense congestion of the radio access network. Then the eNodeB 202 may mark congestion in a packet header of uplink data. A packet header having a congestion mark may be one or more of an IP packet header and a GTP packet header. However, a location used in marking congestion is not limited to a header, and any other field selected in uplink data may be alternatively used. A congestion mark may include one or more of congestion severity (i.e., degree of congestion), a congestion solution, and a congestion occurrence time. Additionally, marking details may include one or more of an ECGI (E-UTRAN Cell Global Identifier), a global eNB ID, a cause, information indicating the start/finish of congestion, congestion severity, a congestion solution, a user's premium level, and a congestion occurrence time. In an embodiment, when marking congestion in an IP packet header, the eNodeB 202 may enter '11' in the ECN (Explicit Congestion Notification) field of the IP packet header.

In case of the GTP packet header in another embodiment, the eNodeB 202 may mark congestion through the fourth bit, currently remaining in the GTP packet header (the eighth bit is at the leftmost position), or mark congestion through a new extended header. In the latter case, due to a rich space of a new extended header, any information about one or more of congestion severity, a congestion solution, and a congestion occurrence time may be further marked in addition to a simple mark of congestion.

In embodiments, congestion severity may be expressed in various forms. For example, congestion severity may be marked by means of a load desired to be reduced through a congestion control, the ratio of a load, desired to be reduced, to a current load, a communication speed desired to be reduced, a congestion level, the amount of buffered data, the amount of a remaining space in a buffer, the ratio of buffered data to the entire buffer, and/or the ratio of a remaining buffer space to the entire buffer. Also, congestion severity may be marked in the form of integer from 0 to 100 or from 1 to 100 or in the form of grade such as A, B and C.

In embodiments, a congestion solution may be also expressed in various forms. For example, one or more of a congestion control for each user, a congestion control for each bearer, and a congestion control for each application may be specified. Also, in such a congestion control, it may be further specified what kind of a detailed control for user/bearer/application is needed.

At step 220, the uplink data having a congestion mark is transmitted from the eNodeB to the S-GW. Also, at step 230, the uplink data having a congestion mark may be transmitted from the S-GW to the P-GW.

At step 240, the P-GW may sense congestion of the radio access network, based on the uplink data having a congestion mark.

In case congestion is marked in the IP packet header in an embodiment, the IP packet is delivered to the PDN without any change in shape. Therefore, the ECN field may be changed to two bits ('00', '01' or '10') other than '11' such that the PDN may not be affected by the ECN field.

Additionally, the P-GW 208 that senses congestion may perform a congestion control, based on one or more of the ECGI, the global eNB ID, the cause, the information indicating the start/finish of congestion, the congestion severity, the congestion solution, the user's premium level, and the congestion occurrence time, which are received at step 230.

Figure 2B:
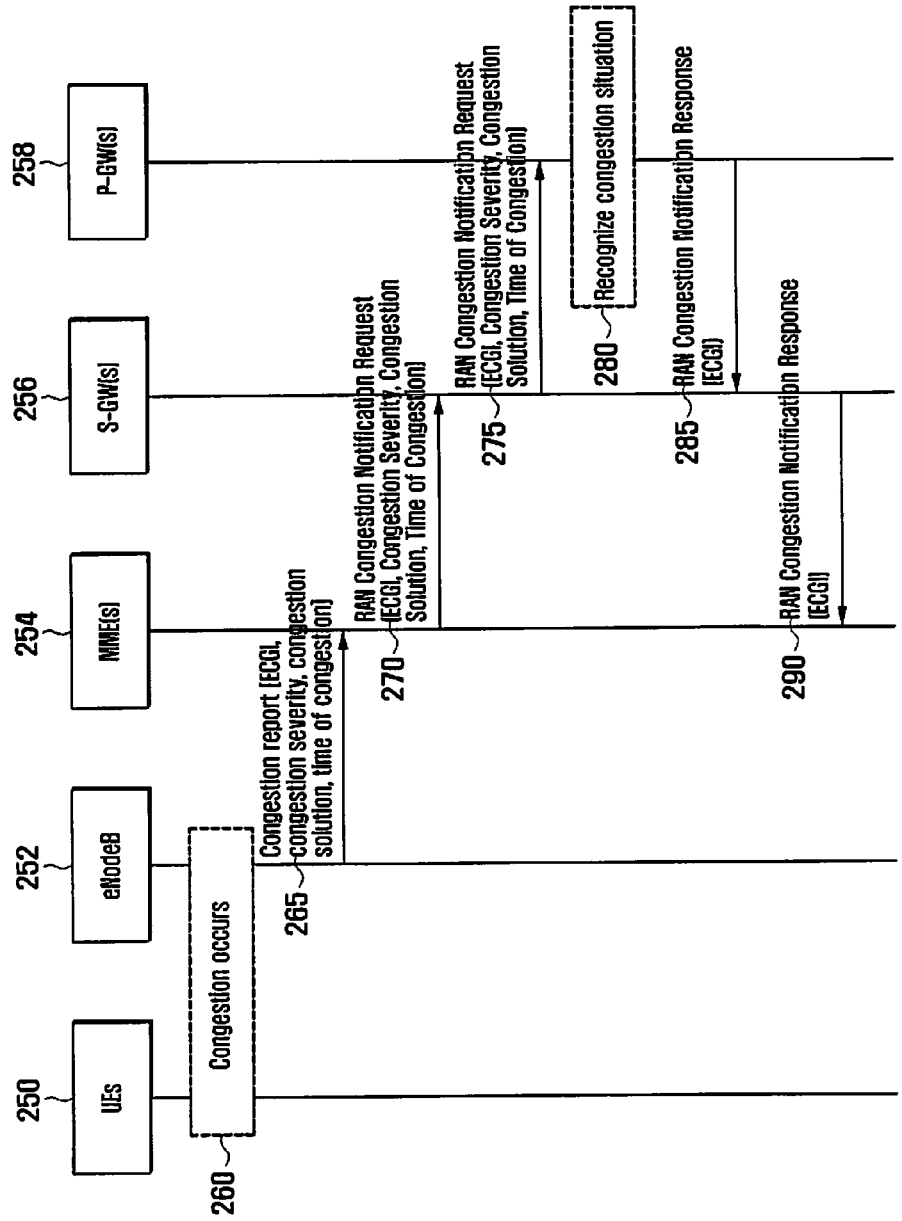
FIG. 2b is a flow diagram illustrating a signal flow for notifying congestion of a radio access network through a control surface in accordance with an embodiment.

FIG. 2b is a flow diagram illustrating a signal flow for notifying congestion of a radio access network through a control surface in accordance with an embodiment.

This embodiment for notifying congestion of the radio access network through the control surface may be realized in a system that includes therein one or more UEs 250, an eNodeB 252, an MME 254, an S-GW 256, and a P-GW 258.

Referring to FIG. 2b, at step 260, the eNodeB 252 may sense congestion of the radio access network.

Then, at step 265, the eNodeB 252 may transmit a message of notifying congestion (or a congestion report) to the MME 254 which is one of MMEs that administer a relevant cell). This message or report may include one or more of the ECGI, the global eNB ID, the cause, the information indicating the start/finish of congestion, the congestion severity, the congestion solution, the user's premium level, and the congestion occurrence time.

In embodiments, this cause may be used to notify the cause of congestion. A disastrous situation is one example of the cause of congestion. A shutdown of one or more of neighboring cells is another example of the cause of congestion. This shutdown may be caused for energy saving. Also, this shutdown may be caused by any other reason. Additionally, this shutdown may include any situation in which the eNodeB fails to operate or part of transceiver in the eNodeB fails to operate.

In an embodiment, the information indicating start/finish of congestion may be notified through one bit. Alternatively, the start/finish of congestion may be notified through congestion severity. In this case, even though the degree of initial congestion is not considerable, the start of congestion may be notified in an embodiment.

According to an embodiment, the eNodeB 252 may transmit the message of notifying congestion to all MMEs 254 that administer a relevant cell.

At step 270, the MME 254 receiving the message from the eNodeB 252, or the MME 254 sensing congestion of the core network even though receiving no message from the eNodeB 252, may check one or more of the ECGI and the global eNB ID and transmit a message of notifying congestion to one or more of the S-GWs 256 that serve the UEs 250 of active mode administered by the identified cell or eNodeB. According to an embodiment, the MME 254 may transmit the message of notifying congestion to all S-GWs 256 that serve the UEs 250. In an embodiment, even though any special message is not received, the MME 254 may transmit the message of notifying congestion to the S-GW 256 in case congestion of the core network is sensed.

In an embodiment, the MME 254 may transmit one or more of the ECGI and the global eNB ID, received from the eNodeB 252, to the S-GW 256. Additionally, in case one or more of the cause, the information indicating the start/finish of congestion, the congestion severity, the congestion solution, and the congestion occurrence time are received from the eNodeB 252, the MME 254 may transmit the received information to the S-GW 256.

At step 275, the one or more S-GWs 256 receiving the message of notifying congestion may check one or more of the ECGI and the global eNB ID and transmit a message of notifying congestion to one or more of the P-GWs 258 that serve the active mode UEs 250 administered by the identified cell or eNodeB. According to an embodiment, the S-GW 256 may transmit the message of notifying congestion to all P-GWs 258 that serve the active mode UEs 250 administered by the identified cell.

At this time, the S-GW 256 may transmit the ECGI, received from the MME 254, to the P-GW 258, and in case one or more of the cause, the information indicating the start/finish of congestion, the congestion severity, the congestion solution, and the congestion occurrence time are received from the eNodeB 252, may also transmit the received information to the P-GW 258.

According to an embodiment, in case the congestion occurrence time is not contained in the message received from the MME 254, and if the single S-GW 256 receives the congestion notifying messages containing the same ECGIs or the same global eNB IDs for a given time, the S-GW 256 may ignore the second message and the subsequent messages.

In case the congestion occurrence time is marked in another embodiment, and if the single S-GW 256 receives the congestion notifying messages containing the same congestion occurrence times and the same ECGIs or the same global eNB IDs, the S-GW 256 may ignore the second message and the subsequent messages.

At step 280, the P-GW 258 may recognize the congestion of the radio access network through the message received from the S-GW 256. Autonomously or by interworking with the PCRF, the P-GW may create new charging information.

At step 285, the P-GW 258 may transmit, to the S-GW 256, a response message to the received message that contains congestion information. The response message may contain one or more of Ack (acknowledge) information, which indicates that the P-GW 258 successfully receives the message containing congestion information from the S-GW 256, the ECGI, the global eNB ID, and the charging information.

At step 290, the S-GW 256 may transmit the response message, received from the P-GW 258, to the MME 254. The response message may contain one or more of the ECGI, the global eNB ID, and the charging information.

Figure 3:
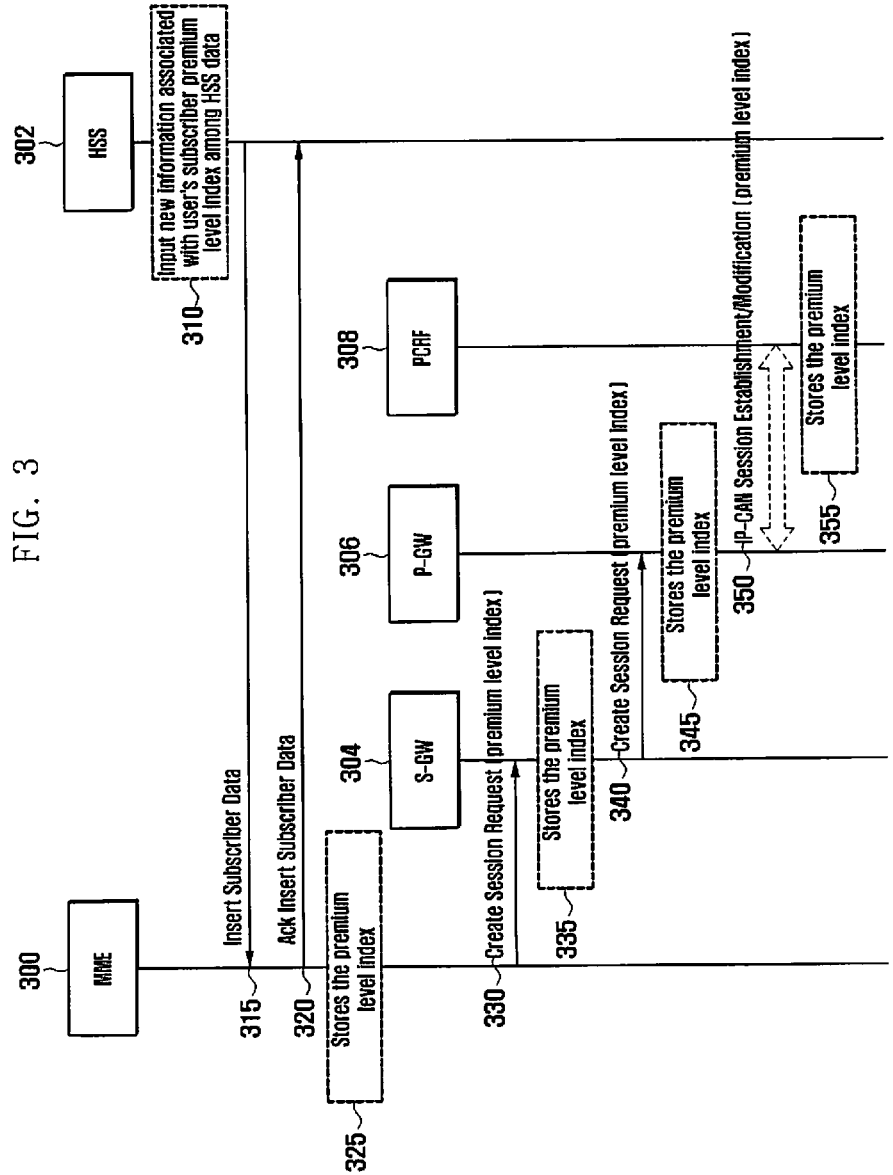
FIG. 3 is a flow diagram illustrating a signal flow for creating new user information at an HSS and implanting subscriber information in a core network requiring user information, for a congestion control through a communication speed control for each user in accordance with an embodiment.

FIG. 3 is a flow diagram illustrating a signal flow for creating new user information at an HSS and implanting subscriber information in a core network requiring user information, for a congestion control through a communication speed control for each user in accordance with an embodiment.

This signal flow may be realized in a system that includes therein one or more of an MME 300, an HSS 302, an S-GW 304, a P-GW 306, and a PCRF 308.

At step 310, the HSS 302 may receive an input of user information to be used for a congestion control through a communication speed control for each user in subscriber information. This use information may include one or more of user's premium level and UE variable.

In embodiments, subscribers may be identified through premium levels. For example, premium levels may be expressed as gold, silver, etc. or in the form of numbers or alphabets. According to an embodiment, such a premium level may be used as priority for determining a communication quality when a specific user is offered data transmission in a network. This determination may be made by a network operator on the basis of, e.g., a charging structure for the user. The UE variable may include one or more of a screen resolution, a supportable codec, and a supportable protocol optimizing scheme. In embodiments, the premium level may be set up by a network service provider, and this service provider may adjust a user's communication priority, etc., depending on the premium level. The premium level may be not limited to a literal meaning thereof and may include any other rating which can be used as criteria for determining and adjusting one or more of a user's communication quality and priority in a network.

At step 315, the user information may be transmitted from the HSS 310 to the MME 300. According to an embodiment, the user information may be delivered from the HSS 310 to the MME 300 through the Insert Subscriber Data procedure.

At step 320, the MME 300 may transmit, to the HSS 302, the Ack message that indicates a success reception of the user information.

At step 325, the MME 300 may store therein the received user information.

At step 330, the MME 300 may insert the received user information in the Create Session Request message and then transmit this message to the S-GW 304.

At step 335, the S-GW 304 may store therein the received user information, which may contain one or more of user's premium level and UE variable.

At step 340, the S-GW 304 may deliver the user information, containing one or more of the premium level and the UE variable, to the P-GW 306 through the Create Session Request message.

At step 345, the P-GW 345 may store therein the received user information that contains one or more of the premium level and the UE variable.

At step 350, the P-GW 345 may transmit the received user information, containing one or more of the premium level and the UE variable, to the PCRF 308. In an embodiment, the P-GW may deliver the premium level to the PCRF through the IP-CAN (Connectivity Access Network) Session Establishment/Modification procedure.

At step 355, the PCRF 308 may store therein the received user information containing one or more of the premium level and the UE variable.

Figure 4:
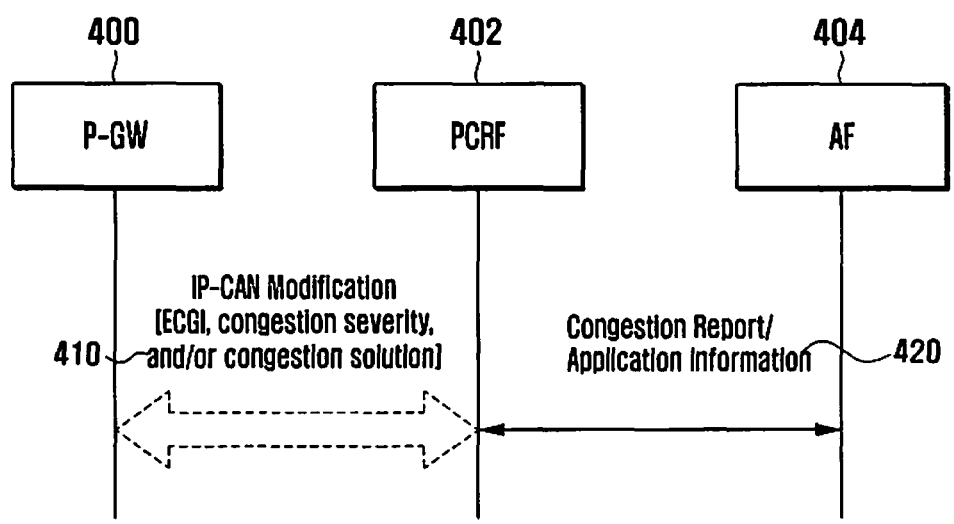
FIG. 4 is a flow diagram illustrating a signal flow for performing a congestion control by interworking with a PCRF and an AF at a P-GW notified of congestion in accordance with an embodiment.

FIG. 4 is a flow diagram illustrating a signal flow for performing a congestion control by interworking with a PCRF 402 and an AF 404 at a P-GW 400 notified of congestion in accordance with an embodiment.

Referring to FIG. 4, the P-GW 400 that is notified of information about congestion through the above-discussed method as shown in FIG. 2 or 3 may transmit, to the PCRF 402, one or more of the ECGI, the global eNB ID, the cause, the information indicating the start/finish of congestion, the congestion severity, and the congestion solution.

According to an embodiment, at step 410, the P-GW 400 may transmit, to the PCRF 402, one or more of the ECGI, the global eNB ID, the cause, the information indicating the start/finish of congestion, the congestion severity, and the congestion solution through the IP-CAN Session Modification procedure.

At step 420, the PCRF 402 that receives information about congestion in the IP-CAN Session Modification procedure may notify any congestion situation to the AF 404 and then receive application information required for determining one or more of a policy and a charging. According to an embodiment, the information received from the AF 404 by the PCRF 402 may include one or more of a flow description and a priority indicator. Finally, the PCRF 402 may notify information containing one or more of the determined policy and charging to the P-GW 400 through the IP-CAN Session Modification procedure, and then the P-GW 400 may perform a congestion control such as reducing a communication speed on the basis of the information received from the PCRF 402.

According to an embodiment, in case the congestion occurrence time is not contained when congestion is notified to the P-GW 400, and if the single P-GW 400 receives the congestion notifying messages containing the same ECGIs for a given time, the P-GW may ignore the second message and the subsequent messages.

In case the congestion occurrence time is marked when congestion is notified to the P-GW 400 in another embodiment, and if the single P-GW 400 receives the congestion notifying messages containing the same congestion occurrence times and the same ECGIs, the P-GW 400 may ignore the second message and the subsequent messages.

The P-GW 400 may autonomously perform a congestion control without interworking with the PCRF 402 and the AF 404 as shown in FIG. 4.

When such a congestion control is performed on the basis of the policy received from the PCRF 402, or when the P-GW 400 autonomously performs such a congestion control, the P-GW 400 performs the congestion control based on a congestion solution if the congestion solution is known to the P-GW 400.

According to an embodiment, in case there is no congestion solution received by the P-GW 400, the P-GW 400 may perform the congestion control for each user on the basis of user information containing a premium level. Also, the congestion control for each bearer may be performed on the basis of QoS (Quality of Service) of bearer. And also, the congestion control for each application may be performed on the basis of information about one or more of a port number and an application identifier.

Figure 5:
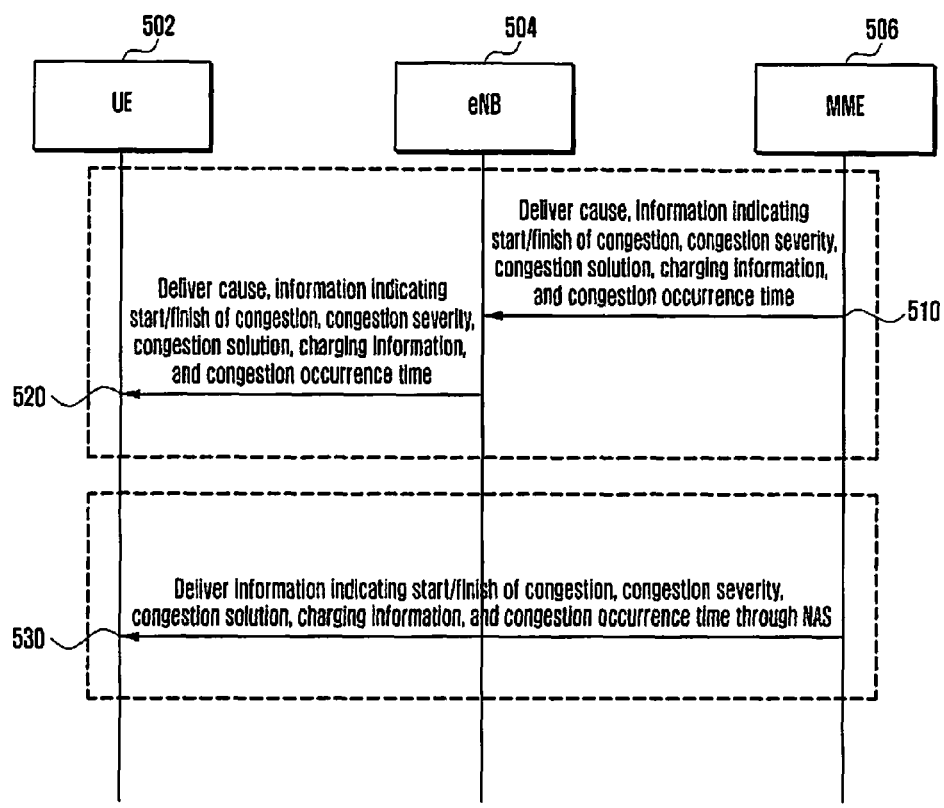
FIG. 5 is a flow diagram illustrating a signal flow for delivering congestion information to UE, for a congestion control in accordance with an embodiment.

FIG. 5 is a flow diagram illustrating a signal flow for delivering congestion information to UE, for a congestion control in accordance with an embodiment.

Referring to FIG. 5, the signal flow may be realized in a system that includes one or more of UE 502, an eNB 504, and an MME 506.

According to an embodiment, at step 510, the MME 506 that is aware of congestion of the wireless communication system may deliver, to the eNB 504, one or more of the ECGI, the cause, the information indicating the start/finish of congestion, the congestion severity, the congestion solution, the charging information, and the congestion occurrence time.

At step 520, the eNB 504 that receives a message from the MME 506 at step 510 or senses congestion may autonomously deliver, to the UE 502, one or more of the cause, the information indicating the start/finish of congestion, the congestion severity, the congestion solution, the charging information, and the congestion occurrence time.

In another embodiment, the MME 506 that is aware of congestion of the wireless communication system may deliver one or more of the cause, the information indicating the start/finish of congestion, the congestion severity, the congestion solution, the charging information, and the congestion occurrence time to the UE 502 through an NAS (Non Access Stratum) in different ways from steps 510 and 520 at step 530.

The UE 502 that receives the information through steps 510 and 520 or step 530 may display, on a screen thereof, information about one or more of the cause, the information indicating the start/finish of congestion, the congestion severity, the congestion solution, the charging information, and the congestion occurrence time. Based on contents displayed on the screen, a user can participate in the congestion control. Additionally, the UE 502 may perform a communication speed control according to realization for each user, each application or each content.

Figure 6A:
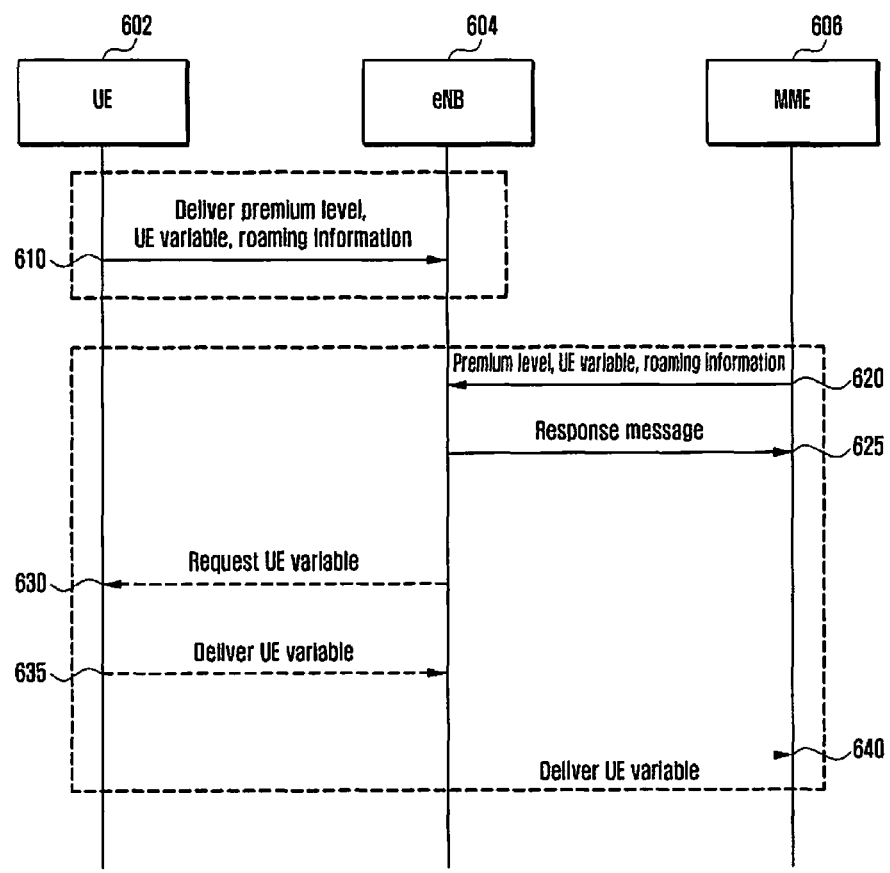
FIG. 6a is a flow diagram illustrating a signal flow for implanting user information in an eNB through one or more procedures of a location registration and a service request, for a congestion control through a communication speed control for each user in accordance with an embodiment.

FIG. 6a is a flow diagram illustrating a signal flow for implanting user information in an eNB through one or more procedures of a location registration (e.g., attach, tracking area update) and a service request, for a congestion control through a communication speed control for each user in accordance with an embodiment.

Referring to FIG. 6a, in case the eNB 604 performs the congestion control according to an embodiment, the eNB 604 may receive information required for the congestion control from one or more of UE 602 and an MME 606.

According to one embodiment, the signal flow may be realized in a system that includes one or more of the UE 602, the eNB 604, and the MME 606.

At step 610, the UE 602 may deliver one or more of a premium level, UE variable, and roaming information to the eNB 604. This information such as the premium level, the UE variable, or the roaming information may be delivered from the UE 602 to the eNB 604 through one or more of the RRCConnectionSetupComplete message, the RRCConnectionReconfigurationComplete message, and the RRCConnetionReestablishmentRequest message.

In embodiments, the roaming information may be expressed as one or more of one-bit information for indicating roaming or not, and a PLMN (Public Land Mobile Network) of the UE 602.

In another embodiment, the eNB 604 may receive information required for the congestion control from the MME 606 and further from the UE 602.

At step 620, the MME 606 may deliver one or more of the premium level, the UE variable, and the roaming information to the eNB 604. This information such as the premium level, the UE variable, or the roaming information may be delivered from the MME 606 to the eNB 604 through the INITIAL CONTEXT SETUP REQUEST message.

At step 625, the eNB 604 may transmit, to the MME 606, a response message to the received message containing one or more of the premium level, the UE variable, and the roaming information. The response message may be delivered through the INITIAL CONTEXT SETUP RESPONSE message and may contain Ack information which indicates that the eNB 604 successfully receives the message from the MME 606.

At step 630, the eNB 604 may request the UE 602 to offer the UE variable. This request may be delivered from the eNB 604 to the UE 602 through the UECapabilityEnquiry message. This request message may be sent from the eNB to the UE 602 when the MME 606 fails to offer the UE variable to the eNB 604 at step 620.

At step 635, the UE 602 may deliver the requested UE variable to the eNB 604. This delivery may be made from the UE 602 to the eNB 604 through the UECapabilityInformation message.

At step 640, the eNB 604 may deliver the UE variable, received from the UE 602, to the MME 606. This delivery may be made through the UE CAPABILITY INFO INICATION message.

According to embodiments described in FIG. 6a, the eNB 604 may receive one or more of the premium level, the roaming information, and the UE variable, and may use this in the congestion control for each user.

FIG. 6b is a flow diagram illustrating a signal flow for implanting user information in a target eNB through a handover procedure, for a congestion control through a communication speed control for each user in accordance with an embodiment.

Referring to FIGS. 6a and 6b, information required for the congestion control delivered to the eNB 604 in FIG. 6a may be needed even when the UE 602 is moved to a new eNB.

The signal flow may be realized in a system that includes one or more of UE 652, eNBs 654 and 656, and MMEs 658 and 660.

At step 670, the UE 652 may deliver one or more of a premium level, roaming information, and UE variable to the target eNB 656. This information such as the premium level, the roaming information, or the UE variable may be delivered from the UE 652 to the target eNB 656 through one or more of the RRCConnectionSetupComplete message, the RRCConnectionReconfigurationComplete message, and the RRCConnetionReestablishmentRequest message.

In another embodiment, one or more of the premium level, the roaming information, and the UE variable may be delivered from the source eNB 654 to the target eNB 656.

According to an embodiment, in case the S1 handover is performed, one or more of the premium level, the roaming information, and the UE variable may be delivered to the source MME 658 through the HANDOVER REQUIRED message at step 690. According to one embodiment, this information such as the premium level, the roaming information, or the UE variable may be sent by being contained in the Source to Target Transparent Container.

In case the source MME 658 is different from the target MME 660, one or more of the premium level, the roaming information, or the UE variable, delivered to the source MME 658, may be delivered to the target MME 660 through the Forward Relocation Request message at step 692. This information such as the premium level, the roaming information, or the UE variable may be sent by being contained in the Source to Target Transparent Container.

At step 695, the target MME 660 receiving one or more of the premium level, the roaming information, and the UE variable delivers this information such as the premium level, the roaming information, or the UE variable to the target eNB 656 through the HANDOVER REQUEST message. This information may be sent by being contained in the Source to Target Transparent Container.

In embodiments, certain step may be skipped or the order of steps may be changed. For example, the above embodiment, step 695 may be performed without steps 690 and 692.

According to another embodiment, in case the X2 handover is performed, one or more of the premium level, the roaming information, and the UE variable may be delivered from the source eNB 654 to the target eNB 656 through the HANDOVER REQUEST message.

According to embodiments described in FIG. 6b, even though the UE 652 is moved to any different eNB 656, this new eNB 656 may receive one or more of the premium level, the roaming information, and the UE variable which are required for the congestion control for each user.

Each of the UE, the eNB and the MME, which are elements shown in FIGS. 5, 6a and 6b, may include therein a transceiver unit for transmitting or receiving data to or from any other entity in any other communication system. Also, a control unit for controlling the transceiver unit, for processing data to be transmitted or to have been received through the transceiver unit, and for determining such data may be included.

While the present invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method by a base station in a communication network, the method comprising:
 identifying whether a congestion between the base station and a terminal occurred; and
 transmitting, if the congestion between the base station and the terminal occurred, congestion information including a cause of the congestion and information on a solution to the congestion, to a mobility management entity (MME) or a serving gateway (S-GW),
 wherein information on charging for the terminal is applied based on the congestion information, and
 wherein traffic corresponding to the terminal is controlled based on the congestion information and subscription information of the terminal in response to the congestion.

2. The method of claim 1, wherein the transmitted congestion information is included in uplink data, and
 wherein the cause of the congestion is included in one or more of an IP packet and a GPRS tunneling protocol (GTP) packet.

3. The method of claim 1, wherein the transmitted congestion information includes an identifier of the base station.

4. A method by a packet data network gateway (P-GW) in a wireless communication network, the method comprising:
 receiving, if a congestion between a base station and the terminal occurred, congestion information including a cause of the congestion and information on a solution to the congestion, from the base station; and
 controlling the congestion based on the received congestion information,
 wherein information on charging for the terminal is applied based on the congestion information, and
 wherein traffic corresponding to the terminal is controlled based on the congestion information and subscription information of the terminal in response to the congestion.

5. The method of claim 4, wherein receiving the congestion information comprises:
 receiving the congestion information via uplink data; and
 identifying whether the congestion occurred, based on information included in one or more of a received IP packet and a received GPRS tunneling protocol (GTP) packet.

6. The method of claim 4, wherein the congestion information includes an identifier of the base station.

7. The method of claim 4, wherein controlling the congestion comprises:
 controlling the congestion independently according to a type of user, bearer or application, based on information about one or more of a quality of service (QoS) of the bearer, a port number, and an application identifier.

8. The method of claim 4, further comprising:
 receiving additional information including one or more of policy information, user level information, and application information,
 wherein the congestion is controlled based on one or more of the policy information, the user level information, and the application information.

9. An apparatus of a base station in a wireless communication network, the apparatus comprising:
 a controller configured to identify whether a congestion between a base station and a terminal occurred; and
 a transceiver configured to transmit, if the congestion between the base station and the terminal occurred, congestion information including a cause of the congestion and information on a solution to the congestion, to a mobility management entity (MME) or a serving gateway (S-GW),
 wherein information on charging for the terminal is applied based on the congestion information, and
 wherein traffic corresponding to the terminal is controlled based on the congestion information and subscription information of the terminal in response to the congestion.

10. The apparatus of claim 9, wherein the transmitted congestion information is included in uplink data, and wherein the cause of the congestion is included in one or more of an IP packet and a GPRS tunneling protocol (GTP) packet.

11. The apparatus of claim 9, wherein the transmitted congestion information includes an identifier of the base station.

12. An apparatus of a packet data network gateway (P-GW) in a wireless communication network, the apparatus comprising:
a transceiver configured to receive, if a congestion between a base station and a terminal occurred, congestion information including a cause of the congestion and information on a solution to the congestion, from the base station; and
a controller configured to control the congestion based on the received congestion information,
wherein information on charging for the terminal is applied based on the congestion information, and
wherein traffic corresponding to the terminal is controlled based on the congestion information and subscription information of the terminal in response to the congestion.

13. The apparatus of claim 12, wherein the transceiver is further configured to receive the congestion information via uplink data, and
wherein the controller further configured to identify whether the congestion occurred based on information included in one or more of a received IP packet and a received GPRS tunneling protocol (GTP) packet.

14. The apparatus of claim 12, wherein the congestion information includes an identifier of the base station.

15. The apparatus of claim 12, wherein the controller is further configured to control the congestion independently according to a type of user, bearer or application, based on information about one or more of a quality of service (QoS) of the bearer, a port number, and an application identifier.

* * * * *